Patented Aug. 14, 1945

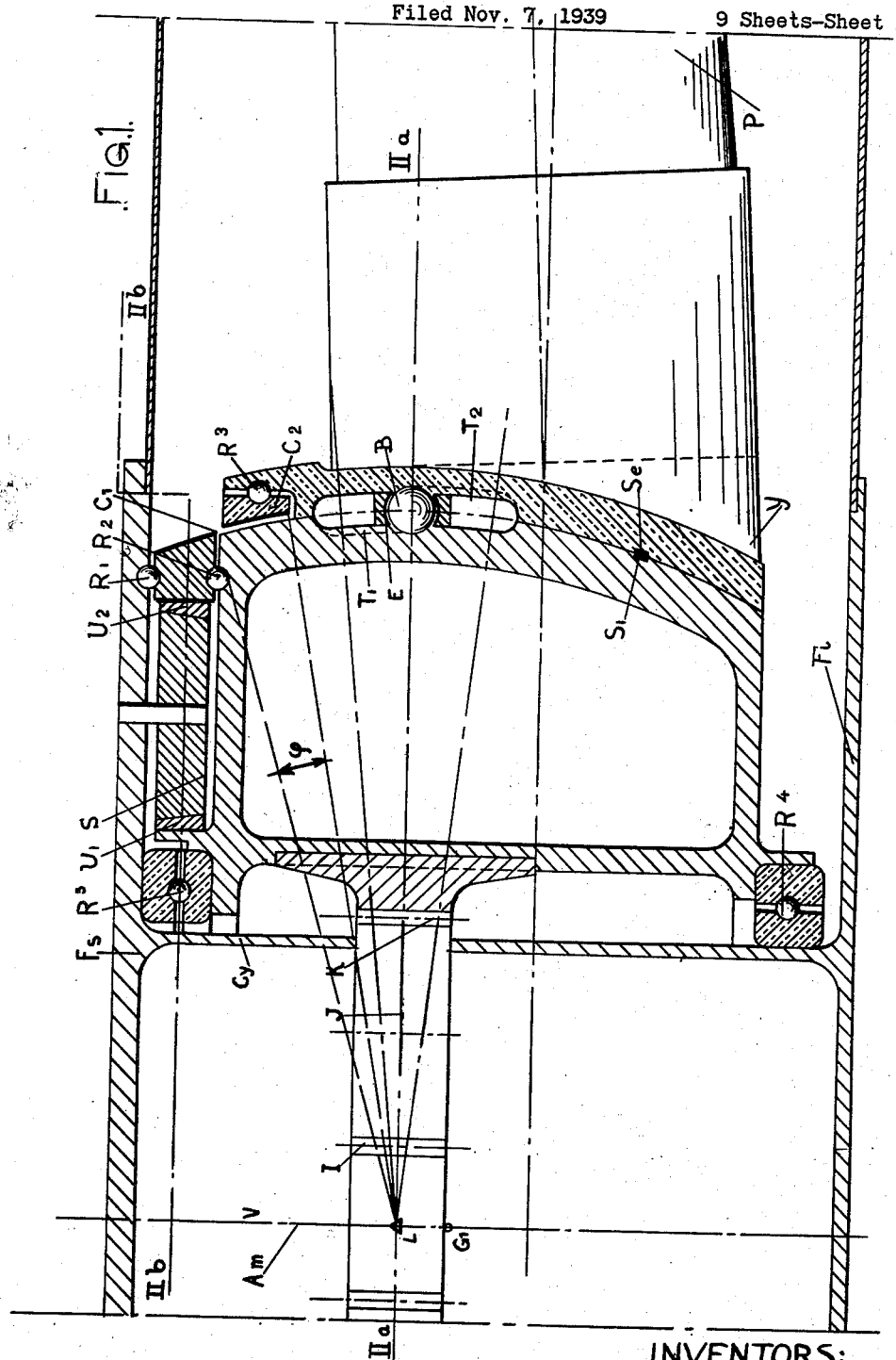

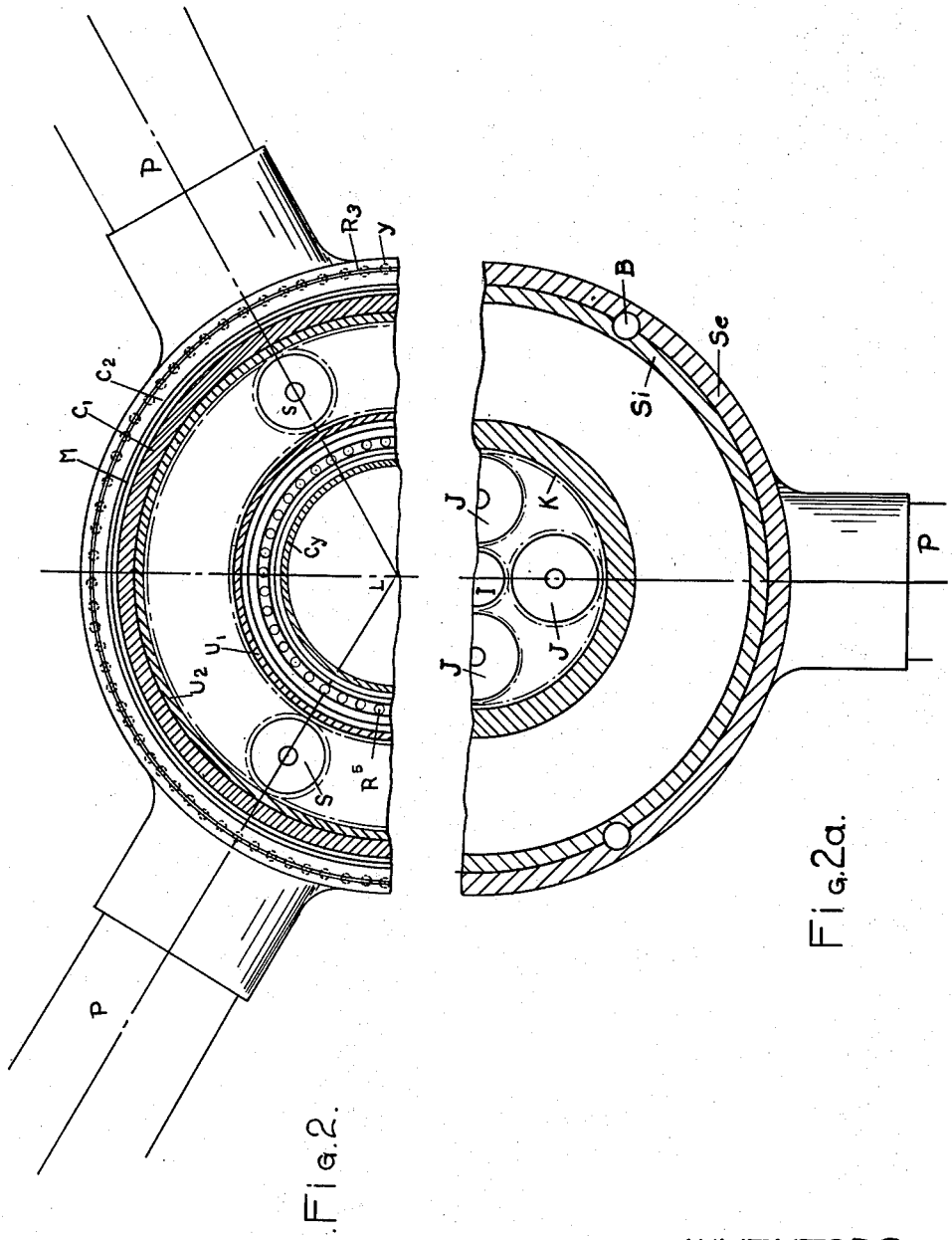

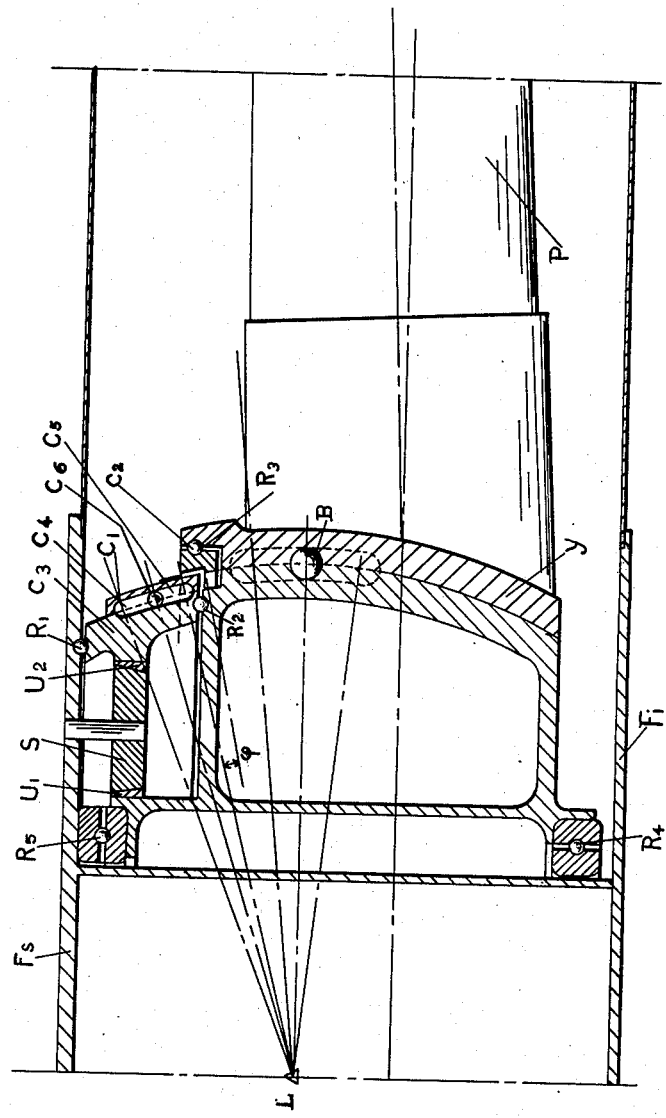

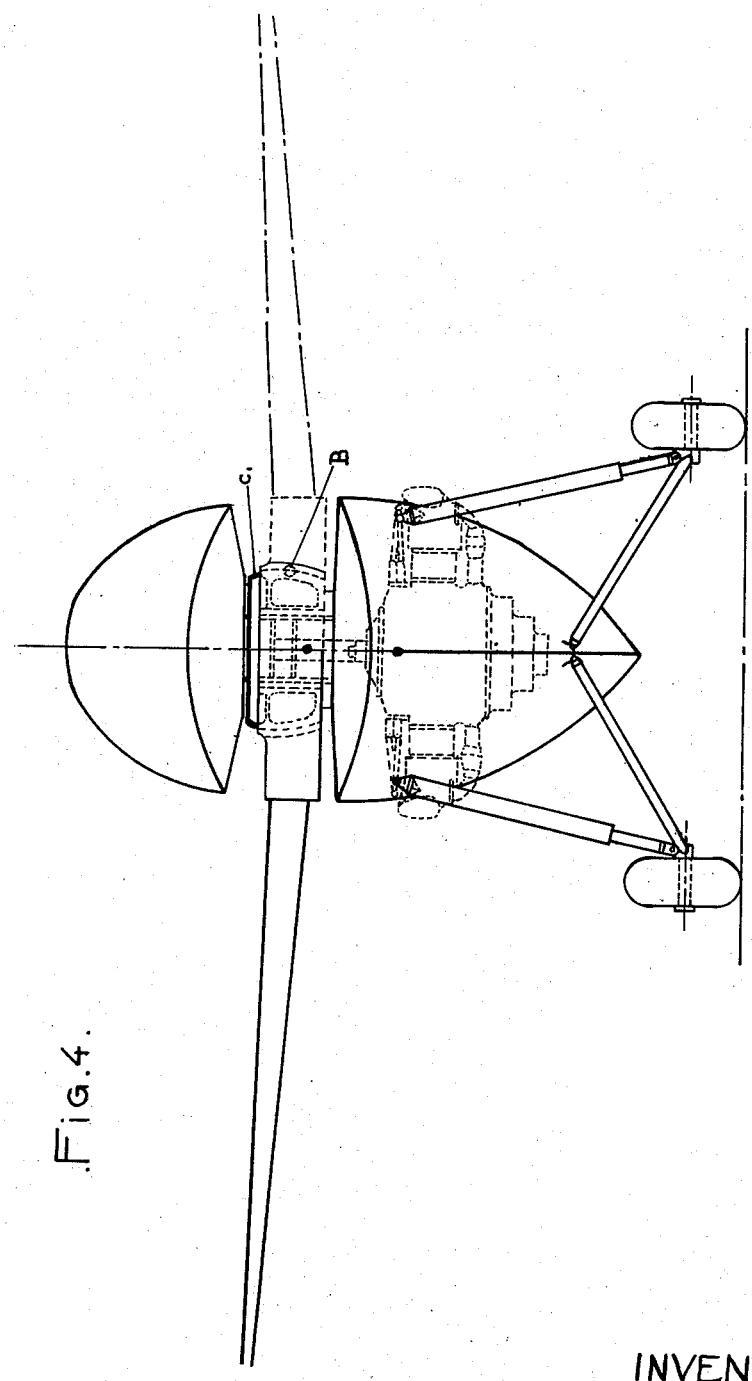

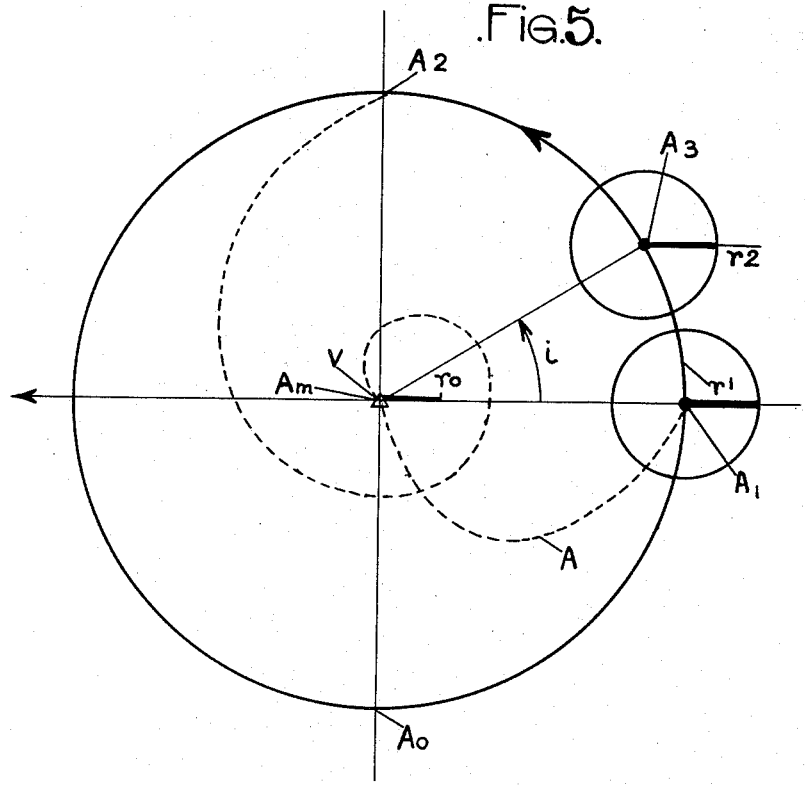

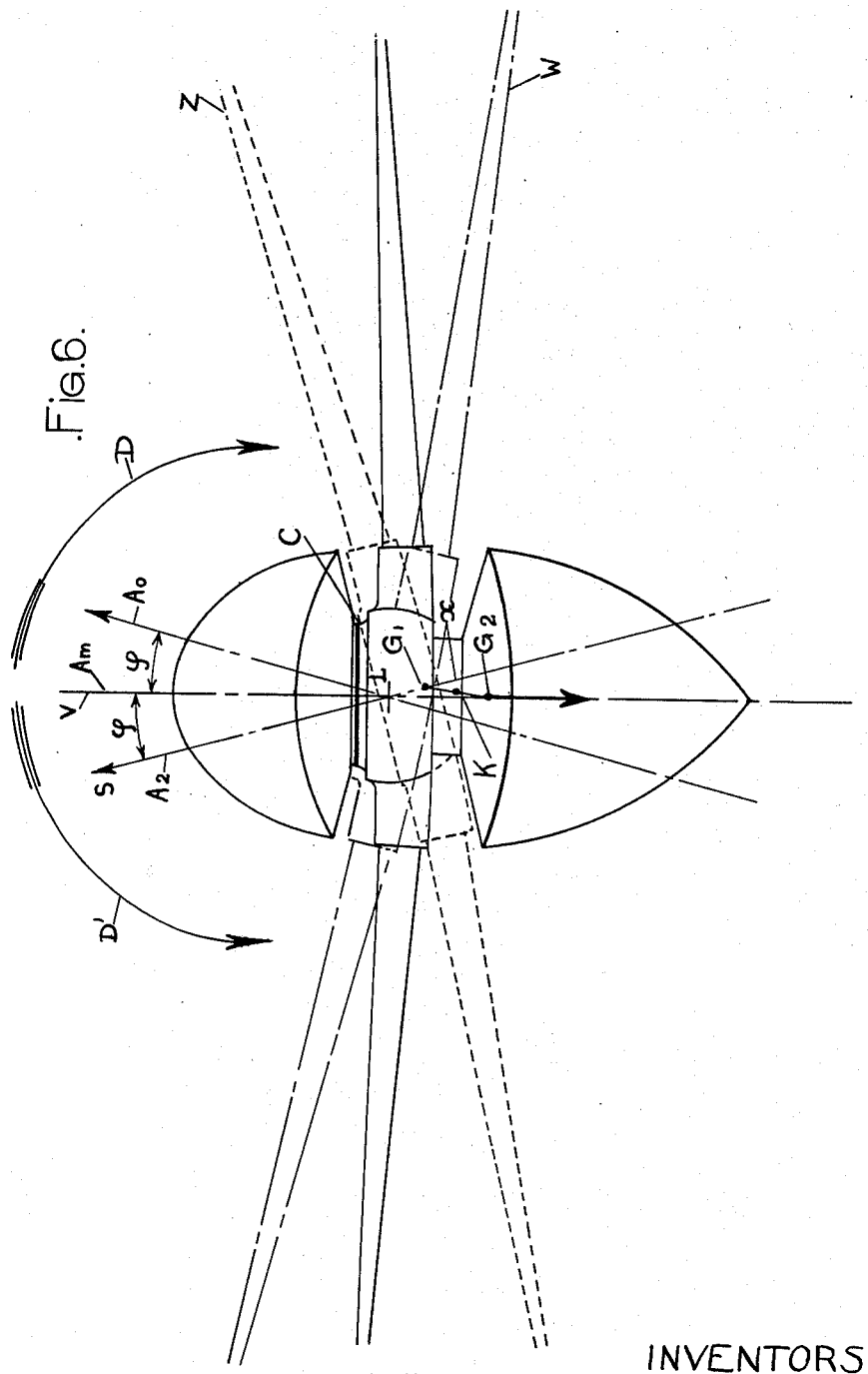

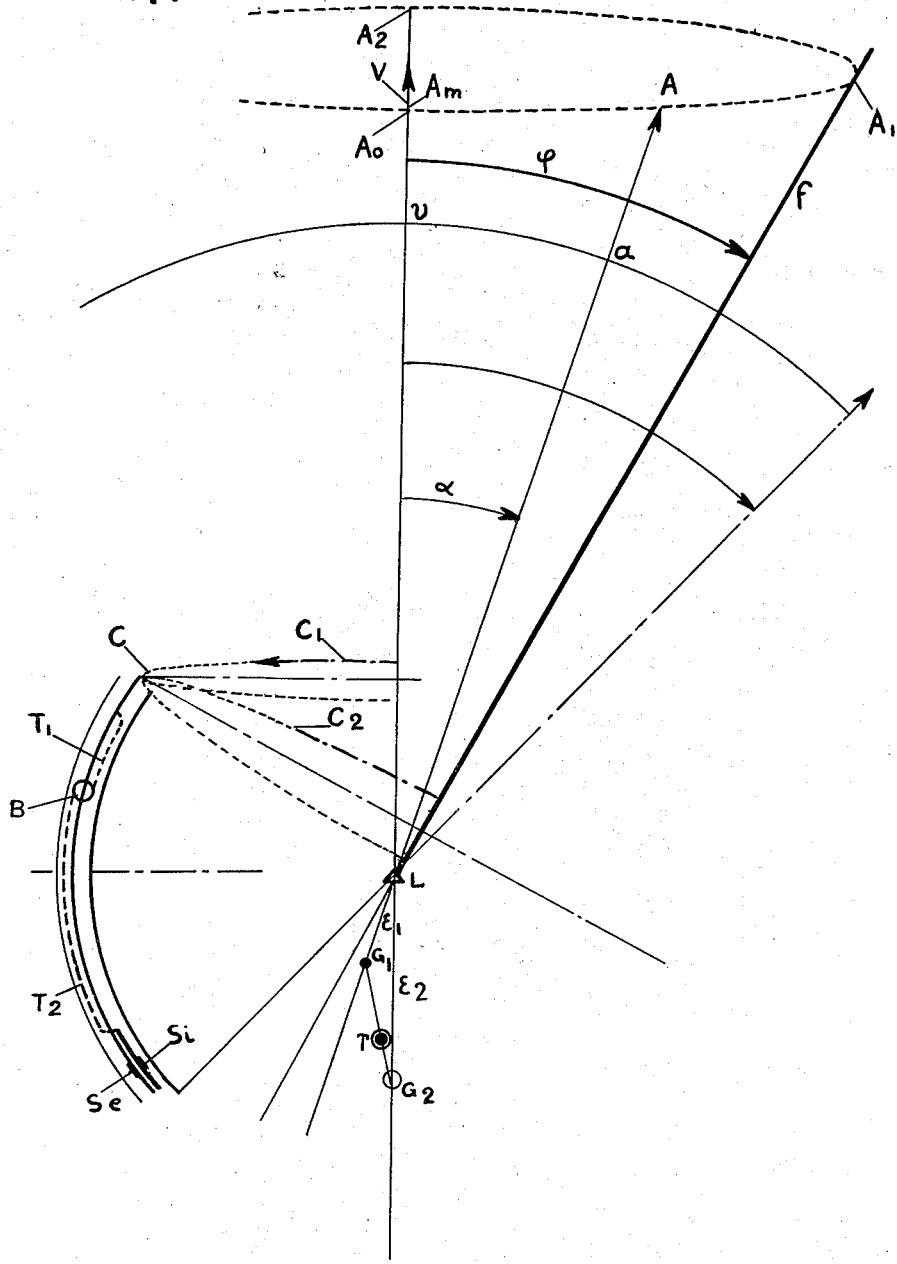

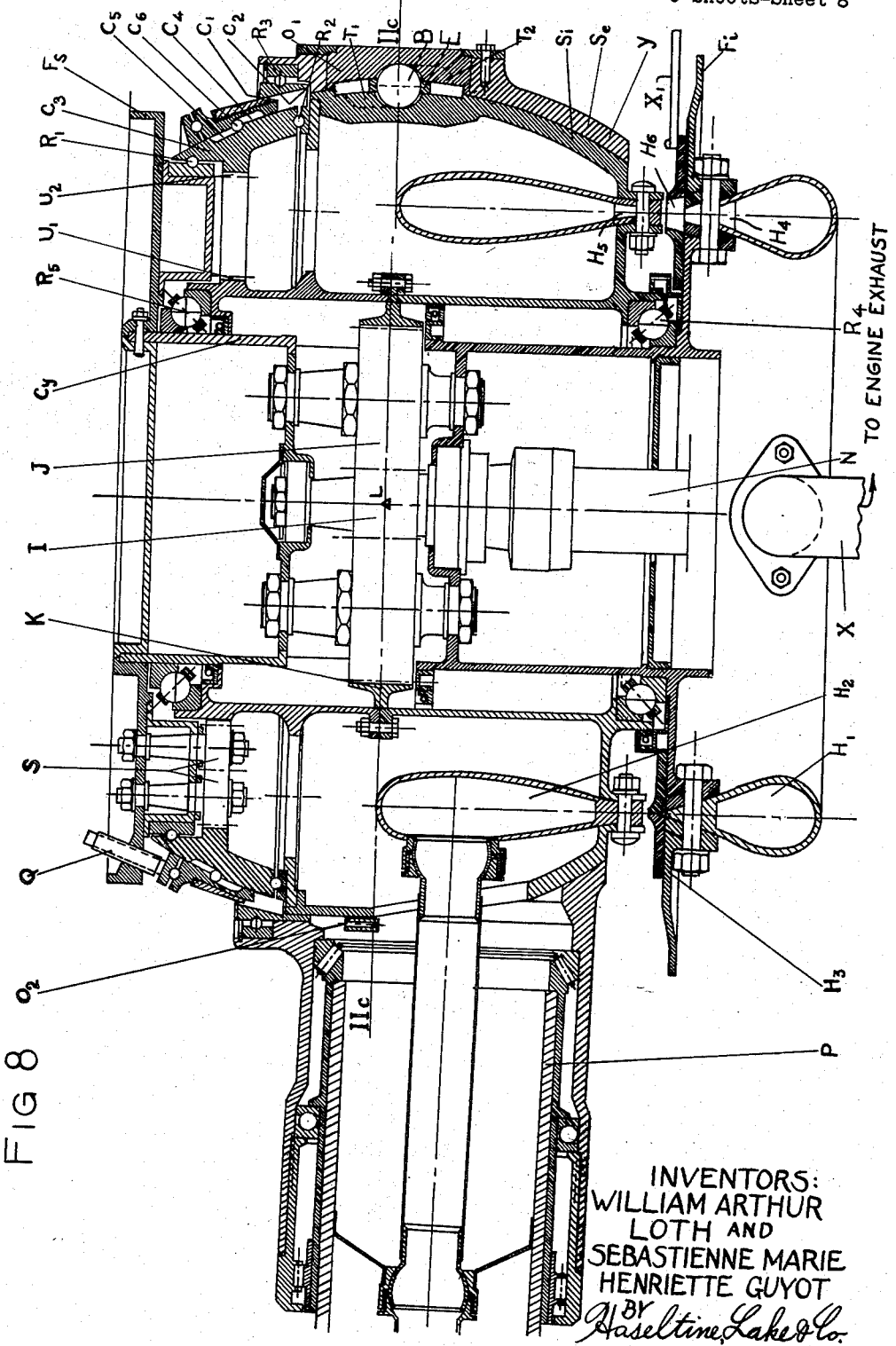

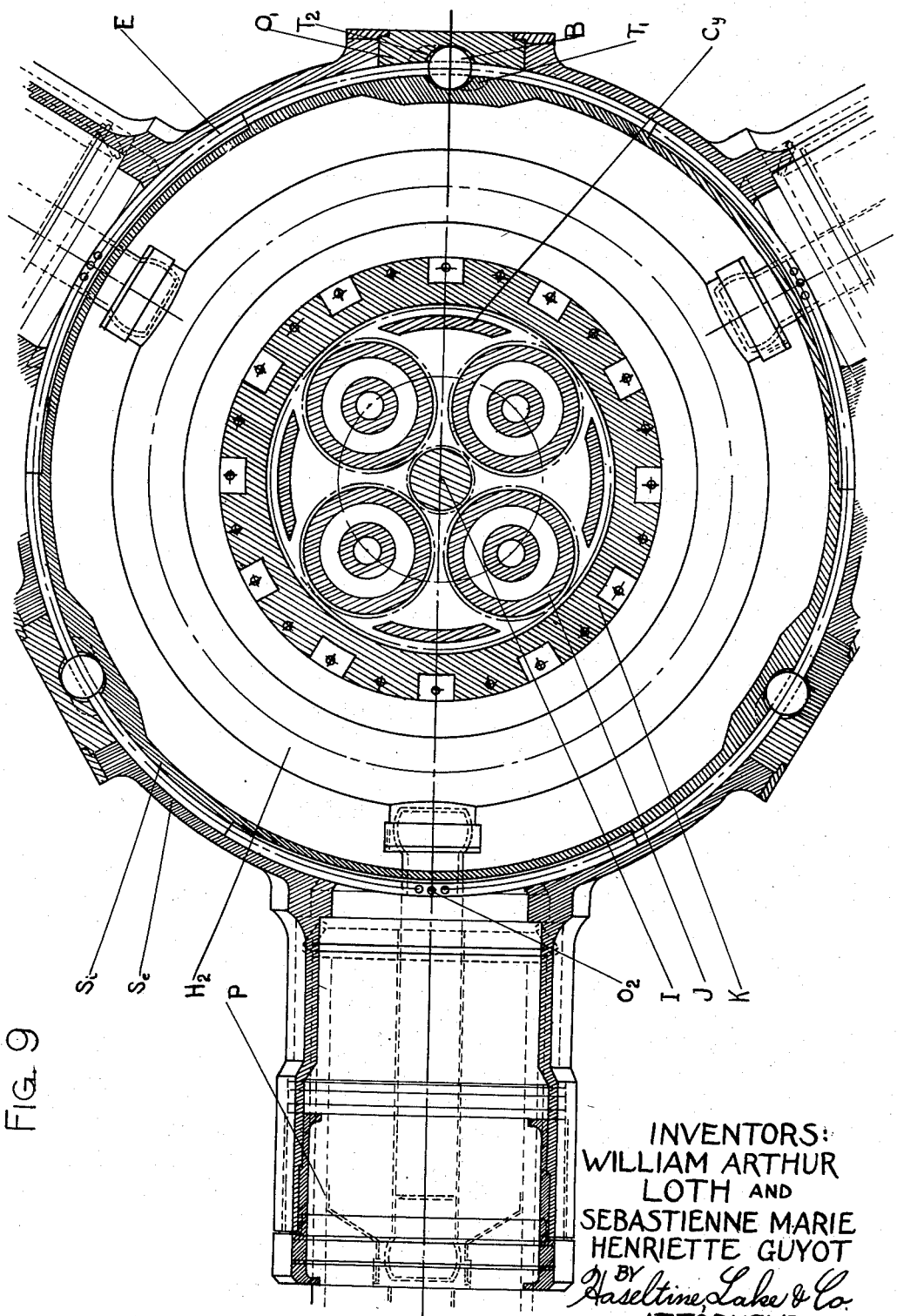

2,382,431

UNITED STATES PATENT OFFICE 2,382,431

SWIVELING SCREW PROPELLER

William Arthur Loth and Sebastienne Marie Henriette Guyot, Paris, France; vested in the Alien Property Custodian Application November 7, 1939, Serial No. 303,182
In France July 31, 1936

6 Claims. (Cl. 170—164)

This patent application is a continuation in part of our earlier patent application Serial No. 156,064 filed on July 28, 1937, now Patent No. 2,241,786 granted May 13, 1941, for "Stabilisation of aircraft and in particular of aircraft based on lifting systems which are mobile relatively to them or on systems which are at the same time lifting and propelling and mobile relatively to them," and certain parts of the present application will be found in the earlier application.

The present invention relates to screw propellers the hub of which is mounted on a driving shaft by means of a universal joint so that the axis of rotation of the propeller can be freely displaced into any angular position relatively to said shaft within an imaginary cone the apex of which coincides with the centre of the joint, the axis of the cone normally coinciding with the axis of rotation of the propeller. This property which the propeller possesses is hereinafter referred to as "swiveling."

Certain portions of the apparatus herein are also shown in our mentioned Patent No. 2,241,786, such as the stator and rotor and their mutual spherical bearings, connections and general arrangement, the invention being based on certain improvements in said structure and particularly of the means for producing the inclination of the axis of the rotor with respect to that of the stator.

According to the present invention a swiveling screw propeller as defined above is characterised in that the said joint has its parts rotating in synchronism in that it maintains the ratio of the instantaneous speeds of rotation of the propeller and of the driving shaft constant for all angular positions of the axis of rotation of the propeller within the cone, and also during the entire duration of all movements of inclination of the axis of rotation of the propeller relatively to the driving shaft.

This property of having the parts of the joint rotating synchronously is not displayed by Cardan joints in which the ratio of the instantaneous speeds of inclined driving and driven shafts is constant only at certain points during rotation.

A further characteristic feature of the invention resides in the fact that when the propeller is inclined so that the axis of rotation thereof coincides with the surface of the imaginary cone the apex angle of which has been preselected according to the conditions, the propeller is subjected to an impulse (hereinafter referred to as a precession impulse) which compels the axis of rotation of the propeller to describe a portion of said conic surface (the precession cone). In this manner the axis of rotation of the propeller reaches a position in which the propeller exerts a stabilising torque as will be explained hereinafter. This precession impulse takes place without producing (and consequently having to overcome) acceleration and deceleration forces, owing to the fact that the joint is of the synchronously rotating class.

The operation previously described is not affected by adjustment of the axis of rotation of the propeller relative to the driving axis either before or during movement of the body which the propeller is propelling—in the case of an aeroplane during flight for instance.

It is to be understood that a swiveling screw propeller in accordance with the present invention is not to be limited as to the type of movable body with which it may be associated. This may be an aeroplane, land vehicle, surface water vessel or under water craft and this broad application is to be understood when the term "movable body" is used throughout the description and claims.

Joints of the synchronously rotating class are well known per se and there is a type of such joint which comprises spherical members drivingly coupled to each other by a series of balls engaging meridian race grooves in the adjacent faces of said members, and a cage engaging said balls which are maintained in a diametral plane.

We are aware that it has previously been proposed in British Specification numbered 878 of 1903, to mount a swiveling screw propeller on an airship by means of a joint which is adapted to maintain constant the ratio of the instantaneous speeds of rotation of the propeller and of the driving shaft when the axis of rotation of the propeller has been displaced to a new position but which forces the propeller to undergo certain variations in the speed of rotation while it is being displaced with respect to the driving shaft. Such a joint therefore does not fulfil the condition of synchronous rotation as defined above.

It has previously been proposed in the gimbal mountings of apparatus used on board ships, aircraft or other oscillating bodies or in similar universal joint mechanisms to provide two gimbal rings, universal joints or the like arranged in series between the apparatus and the oscillating body, the two rings or joints being connected by a Cardan member controlled by the relative inclination of the apparatus and the oscillating body so that a constant-velocity (homokinetic) coupling is provided therebetween.

The accompanying drawings illustrate, by way of example only, some embodiments of the invention.

Figure 1 is a sectional elevation of a propeller hub constructed in accordance with the present invention;

Figure 2 is on a smaller scale; the same being a sectional plan view taken on the line IIb—IIb of Figure 1; Figure 2A is a sectional plan view taken on the line IIa—IIa of Figure 1;

Figure 3 is a sectional elevation of a second construction;

Figure 4 is an elevation of a helicopter provided with the propeller shown in Figure 3;

Figures 5, 6 and 7 are diagrammatic views showing the operation of the homokinetic joint and mechanism for bringing the propeller into the stabilising position in which the stabilising torque is then exerted;

Figure 8 is a sectional elevation of a constructional embodiment corresponding to Figure 3;

Figure 9 is a partial horizontal section made according to line IIc—IIc of Figure 8.

The most general problem of the control of a swiveling propeller as applied by way of example to helicopters will now be described at length, stress being laid on the problem of stabilisation.

Referring to Figures 1 and 2 of the accompanying drawings; the rotor blades P are secured to one element of the synchronously rotating joint generally indicated by Y the element being adapted to be rotated (when not inclined) about the vertical axis $A_m$ which in the non-inclined condition coincides with the axis V of the driving shaft. On the latter shaft (which is not shown) is mounted pinion I which drives the joint Y through reduction gear J and the ring gear K.

The mechanism described above is enclosed within a casing $C_y$ which is formed in two separate parts, the upper part $F_s$ and the lower part $F_1$ which may be considered to be parts of the fuselage or stator.

A bearing $R_4$ is disposed between the casing $C_y$ and the joint Y to enable the rotor to be rotatably driven around the casing, whilst a thrust bearing $R_5$ is also provided between the joint and casing.

The synchronously rotating joint comprises the two elements having the spherical surfaces $S_i$ and $S_e$.

A groove $T_1$ is formed on the surface $S_i$ and a second groove $T_2$ is formed on the surface $S_e$, both said grooves being equally inclined but in opposite directions to a meridian passing through a ball B. The grooves are adapted to cooperate and have maintained therebetween the ball B. There are provided three pairs of such grooves spaced equally around the joint each pair with a ball (see Figure 2), which balls are associated with a connecting cage E extending around said joint. Any device may be used which maintains the centres of the balls in a plane bisecting the angle between the axes of the driving and driven shaft when the latter is inclined with reference to the former.

It should be noted that if the grooves are perfect loxodromics (that is are parts of curves which cross all the meridians of the spheres at the same angle of inclination) it follows that the balls will be maintained on a diametrical circle as with this arrangement the balls are automatically maintained in the bisecting plane.

From the above description it is clear that the synchronously rotating joint Y is rotatably driven from the pinion I, through reducing gear J, ring gear K, and due to the coaction of the balls B and grooves $T_1$ and $T_2$ the drive is transmitted to the outer element of the joint and hence to the blades P. It will also be apparent that it is possible to displace the outer spherical element relative to the inner element (thereby inclining the plane of the rotor blades) and it is clear that since the joint is homokinetic this may be done without varying the speed of rotation of the rotor.

A stabilising mechanism is provided in conjunction with the synchronously rotating joint mounting of the blades P.

This mechanism comprises a driving annulus $C_1$ disposed between bearings $R_1$ and $R_2$ (respectively engaging the upper part $F_s$ of the casing $C_y$ and the inner element of the joint Y) said annulus being driven by the inner element through a ring gear $U_1$ (secured to said element) and reduction planet gears S engaging a ring gear $U_2$ secured to said annulus $C_1$.

A driven annulus $C_2$ which is capable of engagement with the driving annulus $C_1$ is mounted within the outer element of joint Y by means of a bearing $R_3$ so that it is free to rotate therein. The outer face of the annulus $C_1$ or the inner face of annulus $C_2$ is faced with any well known friction lining material. The two faces (of the annuli $C_1$ and $C_2$) are so designed that upon the outer spherical element of the homokinetic joint being inclined the faces are gradually brought into engagement until they ultimately become wedged and locked together.

There will firstly be described how, when the rotor is subjected to disturbance, it is in consequence subjected by the stabilising mechanism to an artificial precession movement, and, secondly, the effect of the latter.

The stabilising mechanism becomes operative when the rotor is subjected to a disturbance so that the axis of the rotor is moved into an inclined position with reference to the axis of the driving shaft to such an extent that the rotor axis coincides with the surface of the precession cone which we will assume has an apex angle of twice $\varphi$.

Referring to Figure 6, let it be assumed that a squall strikes the helicopter in the direction indicated by arrow D, so that the rotor is moved relatively to the stator from the position indicated in full lines to a position in which the right-hand blade is below the full line position (shown in chain-dotted lines W).

Due to the fact that the rotor is inclined by the squall the axis of rotation of the rotor will be moved from the vertical $A_m$ towards $A_o$ (see also Figures 5 and 7). Whilst inclination of the rotor axis towards $A_o$ is taking place the rotor due to its rotation will act as a gyroscope the axis of rotation of which is inclined to the vertical. As a result of the gyroscopic effect produced the rotor axis will be rotated around vertical axis V. When the axis of the rotor becomes inclined at angle $\alpha$ to the vertical (which takes place at some point A), annulus $C_2$ will be brought into engagement with annulus $C_1$ which will by a rolling action therefore drive annulus $C_2$ and the latter will freely rotate in the outer spherical element. When due to the squall the axis of rotation is inclined at angle $\varphi$ to the vertical (so that the axis coincides with the surface of the precession cone) which is assumed to take place at point $A_1$ (Figures 5 and 7) locking engagement between the annuli $C_2$ and $C_1$ takes place at point $c$ (Figure 7). This locking engagement is such that annulus $C_2$ can no longer freely rotate in the outer spherical element but is constrained to move round with point $c$ thereof in contact with annulus $C_1$ as the latter rotates, carrying with it the outer spherical element in an artificial precession movement. Consequently the axis of the annulus $C_2$ (which is also the axis of rotation of the rotor) is compelled to describe a portion of the surface of the precession cone between the points $A_1$ and $A_2$ (Figures 5 and 7). It is seen therefore that the annulus and rotor have been subjected to an artificial precession movement and swiveled around by annulus $C_1$ until the axis of rotation of the rotor and annulus $C_2$ reaches $A_2$. At this point the thrust S (see Figure 6) of the rotor produces a stabilising torque the value of which is $S_x$ ($x$ being the perpendicular distance of the line of action of the thrust from the centre of gravity K of the helicopter).

This stabilising torque counterbalances the squall and nullifies the effect thereof. In Figure 6 it is indicated by the arrow $D_1$, and the position of the rotor after it has been swiveled and during the action of the thrust in the direction of axis S is shown in the dotted position Z.

It is assumed that the squall is persistent and exerted in the same direction, that is from $A_2$ towards $A_0$ (Figure 5) so that when the rotor has been swiveled into the dotted position Z the squall will tend to move the rotor back towards the horizontal position. This results in disengagement of annulus $C_2$ from the locked position with annulus $C_1$ at $c$, so that annulus $C_2$ is again driven by annulus $C_1$ in free rotation in the outer spherical element. This tendency for the squall to move the rotor towards the horizontal position is opposed by the stabilising thrust itself so that a balanced state is set up.

As the squall dies away, the rotor returns to the initial horizontal position, and its axis $A_m$ once again becomes vertical and coincides with V.

Considering the effect of the synchronously rotating joint during the sequence of events described above it is assumed that in Figure 5, $r_0$ is the diagrammatic representation of a rotor blade when the axis of rotation of the rotor is vertical. When due to the squall the rotor is inclined with reference to the vertical axis and assuming it has reached the position $A_1$ (that is the axis of rotation of the rotor is on the conic surface of the precession cone) then blade $r_0$ will take up position $r_1$. When the rotor is being made to swivel by the precession mechanism from $A_1$ to $A_2$ and the axis of rotation of the rotor has pased through angle $i$ and reached the position $A_3$, in view of the fact that the joint is homokinetic the position of the blade $r_1$ at position $A_3$ will be $r_2$ which with respect to an imaginary plane passing through $A_m$, $A_3$ lags by an angle $i$ assuming of course that the rotor is not being rotatably driven.

The synchronously rotating joint therefore has the effect of eliminating during swiveling of the rotor any tendency for the rotor blades to advance or retard as is the case with a Cardan joint. With the latter the blade is advanced or retarded during swiveling of the rotor and produces acceleration or deceleration forces which would have to be overcome by the precession mechanism.

If the rotary motion of the driving shaft is resumed, in any swiveling movement of the rotor the blades will strictly retain their own driven rotation (that is they will not be accelerated or retarded). Consequently the energy required to produce rotation of the rotor when changing from point $A_1$ to $A_2$ will be neither increased nor decreased. This enables easy starting and maintenance of a swiveling movement without the necessity for additional expenditure of energy in overcoming such forces of acceleration and retardation.

In Figure 3 there is shown a construction in which the rotor may be adjusted to an initial inclination with reference to the driving shaft. Thus if it is desired to incline the rotor so that a forward driving component is produced this may be effected in the construction shown without causing locking engagement of the annuli $C_2$ and $C_1$ and consequent swiveling of the rotor. Should the rotor be inclined from this initial position of adjustment due to a disturbance (such as a squall striking the machine) so that the axis of rotation reaches the surface of the cone of precession (the geometric axis of which is the axis of rotation of the rotor in its initially adjusted position) the rotor will be compelled to describe a portion of said conical surface.

In Figure 3 (as described with reference to Figure 1) the rotor blades P are secured to the joint Y which rotates on bearing $R_4$.

The precession mechanism comprises a carrier member $C_3$ disposed between bearings $R_1$ and $R_2$ (respectively engaging the upper part $F_s$ of the casing and the inner spherical element of the joint), said carrier member being driven from the joint through a ring gear $U_1$ (secured to the inner spherical element of the joint) and reduction planet gears S engaging a ring gear $U_2$ secured to said member $C_3$.

In the mechanism shown in Figure 3 the driving annulus $C_1$ is not in fixed relationship to the inner spherical element but is capable of sliding on the carrier member $C_3$. In order that the annulus $C_1$ may be rotatably driven by member $C_3$ their adjacent faces are provided with a plurality of elongated grooves $C_4$ and $C_5$ respectively. These grooves are regularly disposed around the annulus and carrier member and have balls $C_6$ mounted therebetween. The latter form the common driving element.

A driven annulus $C_2$ which is capable of engagement with the driving annulus $C_1$ is mounted on the outer spherical element of the joint Y by means of the bearing $R_3$ so as to be free to rotate therein.

Suitable means (not shown) are provided for sliding the annulus $C_1$ on carrier member $C_3$, whilst the rotor is being tilted to bring its axis into the initially inclined position above referred to. Annulus $C_1$ is slid on member $C_3$ so as to be inclined to the driving axis by the same amount as the rotor and annulus $C_2$. This means that the annuli $C_1$ and $C_2$ are maintained parallel during and after tilting thereof.

This initially inclined axis of rotation of annulus $C_1$ and of the rotor now constitutes the geometric axis of the cone of precession.

When the axis of rotation of the rotor is inclined to said geometric axis (as by a squall) to such an extent that it reaches the surface of the cone of precession, annulus $C_2$ engages lockingly with annulus $C_1$ and the mechanism producing artificial precession is brought into operation as before.

The propeller blades may be provided with means for varying the pitch of the blades without departing from the scope of the invention.

Figures 8 and 9 show a constructional embodiment of the arrangement illustrated somewhat diagrammatically in Figure 3 and already described. In Figures 8 and 9 the same reference letters and numerals designate the same parts as in Figure 3.

In Figures 8 and 9 are shown:

At N, the transmission of the driving movement to the shaft of the reducing device, At $O_1$, a bushing which can be taken to pieces and which allows the mounting of balls B, At $O_2$, the three pin joints which allow the mounting of the cage for the balls B, At Q, set screws which allow of determining the orientation of the artificial precession mechanism.

In this constructional embodiment use is made of a means for inclining the rotor from the exhaust gases of the engine. This means is only an example among others to which recourse may be had.

Said embodiment comprises the following:

An exhaust ring $H_1$ secured to the stator, having a connection X to the exhaust of the engine (not shown), a collector for the gas $H_2$ secured to the hub of the rotor and consequently rotating with the latter. Segments $H_3$ are included which can be adjusted by a rod $X_1$, for example, so as to allow the admission of the gases of the exhaust ring $H_1$ to the collector $H_2$ through the apertures $H_4$ and $H_5$ when the segment $H_3$ is shifted by rod $X_1$ to form an opening $H_6$.

In Figure 8, the segments are assumed to be closed at the left and open at the right of said figure. It results therefrom, in this case, from the fact that the exhaust gases are projected from the open segments of ring $H_1$ to the collector $H_2$, that these gases definitely tend to produce an inclination of the rotor to the left, which would result, in fact, in a rearward inclination, owing to the gyroscopic effect.

In this embodiment, it is necessary to distinguish:

(1) The mechanism controlling the inclination of the rotor obtained in this case by a differential azimuthal emission of the gases into the rotor;

(2) The mechanism controlling the orientation of the stabilising system, shown in the drawings, by screws (connected to the pilot) adjusting the position of the annulus $C_1$.

Of course, after having determined by means of the first mechanism the inclination of the axis of the rotor, the pilot sets, parallel to said axis, the axis controlling the stabilization, by means of the second mechanism.

What we claim as our invention and desire to secure by Letters Patent is:

1. A swiveling screw propeller having a support and a drive shaft, a hub driven from said drive shaft, propelling and sustaining blades mounted on said hub, a universal joint associated with said hub connecting the blades with said drive shaft and having means associated therewith to cause the driven and driving portions of said joint to rotate uniformly synchronously in all angular positions of the axis of the propeller with respect to the drive shaft and during movements of inclination of the axis of rotation of said propeller with respect to said drive shaft in order to attain new relative angular positions, and fluid operated precession means for stabilizing the axis of the propeller, including gas ejecting means on the support receiving exhaust gases from the engine driving the propeller and a gas collector mounted on the hub, together capable of imparting a precession impulse to said propeller so as to cause the axis of rotation thereof to trace a portion of the surface of the hub whenever the axis of said propeller tends to depart from the axis of said hub and attains the surface thereof.

2. A swiveling screw propeller according to claim 1, having means for adjusting the axis of rotation of the propeller to an initial position at an angle to the drive shaft and allowing said propeller to swivel in said initial position.

3. A swiveling screw propeller having a support and a drive shaft, a hub driven from said drive shaft, propelling and sustaining blades mounted on said hub, a universal joint associated with said hub connecting the blades with said drive shaft and having means associated therewith to cause the driven and driving portions of said joint to rotate uniformly synchronously in all angular positions of the axis of the propeller with respect to the drive shaft and during movements of inclination of the axis of rotation of said propeller with respect to said drive shaft in order to attain new relative angular positions, the universal joint, the means associated therewith as well as the hub including an inner spherical element rotating about the fixed axis of the drive shaft and secured to said shaft, an outer spherical element directly carrying the blades and rotating about the displaceable axis of rotation of the propeller, a plurality of ball bearings distributed about the inner spherical element, pairs of intersecting grooves formed in the outer surface of said inner spherical element and in the inner surface of said outer spherical element, said grooves being inclined to the axis of said spherical elements, and a cage surrounding said inner spherical member and formed with opening means confining said balls in a diametrical plane and in the corresponding pairs of grooves.

4. A swiveling screw propeller having a support and a drive shaft, a hub driven from said drive shaft, propelling and sustaining blades mounted on said hub, a universal joint associated with said hub connecting the blades with said drive shaft and having means associated therewith to cause the driven and driving portions of said joint to rotate uniformly synchronously in all angular positions of the axis of the propeller with respect to the drive shaft and during movements of inclination of the axis of rotation of said propeller with respect to said drive shaft in order to attain new relative angular positions, precession means capable of imparting a precession impulse to the propeller so as to cause the axis of rotation thereof to trace a portion of the surface of the hub whenever the axis of said propeller tends to depart from the axis of said hub and attains the surface thereof, said precession means including a stabilizing mechanism comprising an inner spherical element, a first annular friction member, means mounting said first annular friction member to turn with said inner spherical element while being free to assume inclinations with respect to said inner spherical element, an outer spherical element surrounding said inner spherical element and carrying a second annular friction member which is freely rotatable relative to said outer spherical element, and means arranged to cause the first annular friction member and the second annular friction member to be brought into frictional engagement with each other when the axis of rotation of the propeller becomes inclined to a predetermined extent with respect to the axis of the drive shaft, so that the first annular friction member will impart a swiveling movement to said second annular friction member and to the outer spherical element, whereby said propeller receives an imparted precessional movement bringing said propeller into a position in which the thrust thereof exerts a stabilizing torque, and adjusting means on said support for selectively predetermining the angular position of said first annular friction member on said inner spherical element so as to determine the orientation of said precession means.

5. A swiveling screw propeller having a support and a drive shaft, a hub driven from said drive shaft, propelling and sustaining blades mounted on said hub, a universal joint associated with said hub connecting the blades with said drive shaft and having means associated therewith to cause the driven and driving portions of said joint to rotate uniformly synchronously in all angular positions of the axis of the propeller with respect to the drive shaft and during movements of inclination of the axis of rotation of said propeller with respect to said drive shaft in order to attain new relative angular positions, the universal joint, the means associated therewith as well as the hub including an inner spherical element rotating about the fixed axis of the drive shaft and secured to said shaft, an outer spherical element directly carrying the blades and rotating about the displaceable axis of rotation of the propeller, a plurality of ball bearings distributed about the inner spherical element, pairs of intersecting grooves formed in the outer surface of said inner spherical element and in the inner surface of said outer spherical element, said grooves being inclined to the axis of said spherical elements, and a cage surrounding said inner spherical member and formed with opening means confining said balls in a diametrical plane and in the corresponding pairs of grooves, said cage comprising a ring and said opening means comprising holes through the ring substantially conformably receiving the balls, said ring being movably positioned in a space formed between the inner and outer spherical elements permitting said ring limited movement circumferentially and vertically with respect to said inner and outer spherical elements as the balls move in the intersecting grooves as the inner and outer spherical elements are moved relative to each other.

6. A swiveling screw propeller having a support and an engine driven drive shaft, a hub driven from said drive shaft, propelling and sustaining blades mounted on said hub, a universal joint associated with said hub connecting the blades with said drive shaft and having means associated therewith to cause the driven and driving portions of said joint to rotate uniformly synchronously in all angular positions of the axis of the propeller with respect to the drive shaft and during movements of inclination of the axis of rotation of said propeller with respect to said drive shaft in order to attain new relative angular positions, and fluid operated precession means for stabilizing the axis of the propeller, including gas ejecting means on the support receiving exhaust gases from the engine driving the propeller and a gas collector mounted on the hub, together capable of imparting a precession impulse to said propeller so as to cause the axis of rotation thereof to trace a portion of the surface of the hub whenever the axis of said propeller tends to depart from the axis of said hub and attains the surface thereof, said gas collector having apertured segments thereon against which the ejected gas impinges, said segments being adjustable to modify the reception of ejected gas by the collector in a manner to control the rotor deflecting effect of the ejected gases.

WILLIAM ARTHUR LOTH.
SEBASTIENNE MARIE
HENRIETTE GUYOT.